US012769326B2

(12) United States Patent
Böhler

(10) Patent No.: US 12,769,326 B2
(45) Date of Patent: Oct. 20, 2026

(54) AUTOMATED GUIDED VEHICLE

(71) Applicant: SICK AG, Waldkirch (DE)

(72) Inventor: Frank Böhler, Breisach-Gündlingen (DE)

(73) Assignee: SICK AG, Waldkirch (DE)

( * ) Notice: Subject to any disclaimer, the term of this patent is extended or adjusted under 35 U.S.C. 154(b) by 94 days.

(21) Appl. No.: 18/597,048

(22) Filed: Mar. 6, 2024

(65) Prior Publication Data

US 2024/0329659 A1 Oct. 3, 2024

(30) Foreign Application Priority Data

Mar. 27, 2023 (DE) ......................... 102023107599.3

(51) Int. Cl.
*G05D 1/622* (2024.01)
*B66F 9/06* (2006.01)
(Continued)

(52) U.S. Cl.
CPC ............. *G05D 1/622* (2024.01); *B66F 9/063* (2013.01); *G05D 1/242* (2024.01); *G05D 1/2435* (2024.01);
(Continued)

(58) Field of Classification Search
CPC ...... G05D 1/622; G05D 1/242; G05D 1/2435; G05D 1/665; G05D 1/2424; G05D 1/667; G05D 1/43; G05D 1/633; G05D 1/65; G05D 2107/70; G05D 2107/95; G05D 2105/28; G05D 2109/10; G05D 2111/17; B60F 9/063; G01S 15/931; G01S 17/42; G01S 17/931
See application file for complete search history.

(56) References Cited

U.S. PATENT DOCUMENTS 11,537,140 B2 12/2022 Suzuki et al.
2010/0266381 A1* 10/2010 Chilson .................. G05D 1/024
414/809

(Continued)

FOREIGN PATENT DOCUMENTS

CN 114265374 A 4/2022
DE 10234730 A1 2/2004

(Continued)

OTHER PUBLICATIONS

Extended Search Report dated Jul. 12, 2024 issued in corresponding European Application No. 24161142.5.

*Primary Examiner* — Ramya P Burgess
(74) *Attorney, Agent, or Firm* — Nath, Goldberg & Meyer; Jerald L. Meyer

(57) ABSTRACT

The present invention relates to an automated guided vehicle for transporting and placing a load, comprising a primary environmental sensor and at least one secondary environmental sensor, wherein the transport vehicle is configured, first, using the primary environmental sensor, to detect a drop-off location for the load and the region between the drop-off location and the transport vehicle and to check said drop-off location and said region for obstacles; if no obstacle is recognized, to travel to the drop-off location; during the journey to the drop-off location, to check the route and the drop-off location for obstacles using the secondary environmental sensor.

18 Claims, 12 Drawing Sheets

Figure 1:
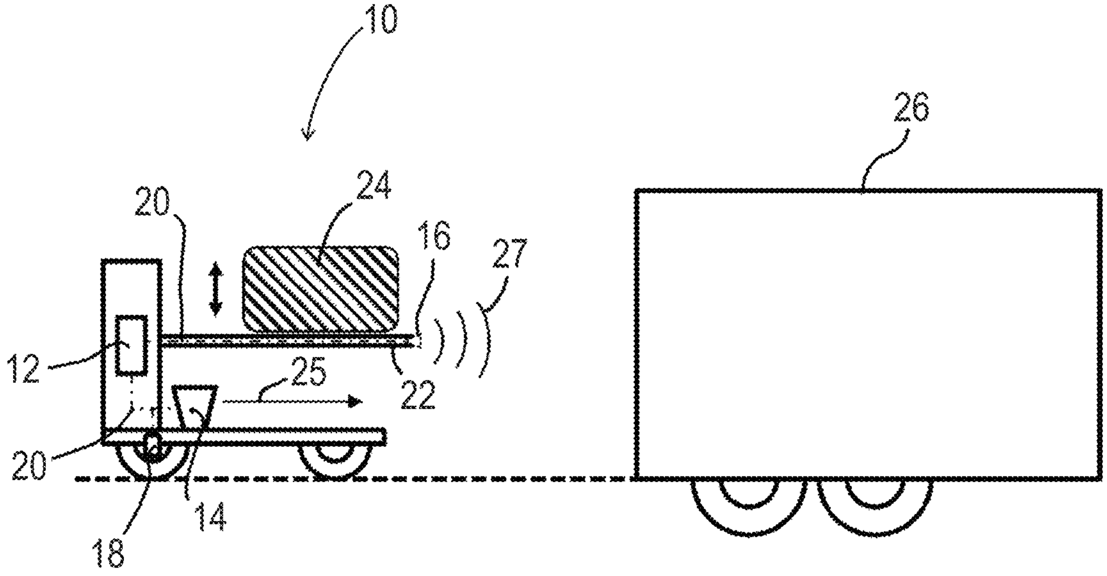

(51) Int. Cl.
*G05D 1/242* (2024.01)
*G05D 1/243* (2024.01)
*G05D 1/656* (2024.01)
*G05D 107/70* (2024.01)

(52) U.S. Cl.
CPC ......... *G05D 1/665* (2024.01); *G05D 2107/70* (2024.01)

(56) References Cited

U.S. PATENT DOCUMENTS

| | | | | |
|---|---|---|---|---|
| 2012/0303176 | A1* | 11/2012 | Wong | G01S 17/89 701/1 |
| 2017/0308086 | A1 | 10/2017 | Watts et al. | |
| 2018/0134531 | A1 | 5/2018 | Tanaka et al. | |
| 2018/0194575 | A1* | 7/2018 | Anderson | B65G 67/02 |
| 2018/0357601 | A1 | 12/2018 | Jacobus et al. | |
| 2020/0239242 | A1* | 7/2020 | Hoofard | G05D 1/622 |
| 2021/0293548 | A1 | 9/2021 | Sorensen | |
| 2025/0109002 | A1* | 4/2025 | Anderson-Sprecher | G05D 1/0246 |

FOREIGN PATENT DOCUMENTS

| | | | |
|---|---|---|---|
| DE | 10323643 | A1 | 1/2005 |
| DE | 102018125916 | A1 | 4/2020 |
| DE | 102019215174 | A1 | 4/2021 |
| DE | 102020105334 | A1 | 9/2021 |
| DE | 102022120971 | A1 | 3/2023 |
| EP | 2339376 | B1 | 2/2012 |
| JP | 2021004113 | A | 1/2021 |

* cited by examiner

AUTOMATED GUIDED VEHICLE

The present invention relates to an automated guided vehicle for transporting and placing a load.

Such transport vehicles are e.g. used in industrial processes to transport loads in an automated manner. Such transport vehicles are in particular also referred to as automated guided vehicles (AGVs).

The loading of e.g. trucks often takes place by means of pallets on which the goods to be transported are located, wherein the pallets should be arranged next to one another in as space-saving a manner as possible in a truck or swap body.

However, such automated guided vehicles have not yet been used in a fully automated manner to load trucks, truck trailers or swap bodies. Such loading is often still performed manually.

In the case of an automatic loading, e.g. of a swap body, it must in particular be ensured that no damage occurs to the swap body or other loads and that any persons in the vicinity are not endangered.

It is therefore the underlying object of the invention to specify a transport vehicle that enables an automated loading of trucks or swap bodies.

This object is satisfied by a transport vehicle according to claim 1.

The automated guided vehicle according to the invention comprises a primary environmental sensor and at least one secondary environmental sensor. The transport vehicle is configured, first, using the primary environmental sensor, to detect a drop-off location for the load and the region between the drop-off location and the transport vehicle, i.e. in particular to scan said drop-off location and said region and check them for obstacles;

if no obstacle is recognized, to travel to the drop-off location;

during the journey to the drop-off location, to check, preferably, the route and the drop-off location for obstacles using the secondary environmental sensor.

The invention is based on the recognition that a very high level of safety can be achieved by the double scanning of the route to the drop-off location and the drop-off location by two different environmental sensors, i.e. a safe operation is made possible. Due to this high level of safety, an automated loading, e.g. of a swap body, can take place since it can be ruled out that, for example, a person is at the drop-off location and is then injured or crushed by the driving in of transport vehicle with the load.

More precisely, the transport vehicle can be loaded with a load, for example a pallet. The transport vehicle then first, using the primary environmental sensor, scans the drop-off location for the load and the region between the drop-off location and the transport vehicle to detect possibly present obstacles (e.g. persons or objects). Due to this scanning by means of the primary environmental sensor, a very high level of safety is already present, e.g. that no persons are present in hazardous areas. If it is now recognized that there is no obstacle, the transport vehicle begins to travel to the drop-off location. During the journey to the drop-off location, the secondary environmental sensor is activated and checks, for example repeatedly and/or periodically, the route to the drop-off location and ultimately also the drop-off location for obstacles, i.e. again for persons or unwanted objects. Even if a person had therefore not been recognized by the detection by the primary environmental sensor or had not yet been at the drop-off location or on the route there at the time of detection, this person could still be recognized by the secondary environmental sensor. However, if an obstacle is recognized by the primary and/or secondary environmental sensor, a reaction can be initiated that, for example, includes stopping the transport vehicle, slowing down the transport vehicle or driving around the obstacle.

If, however, no obstacle is recognized, the transport vehicle can continue on its way up to the drop-off location while being checked by the secondary environmental sensor and can finally unload the load at the drop-off location.

The primary environmental sensor and the secondary environmental sensor are in particular sensors that are separate from one another and that are preferably also different types of sensors. The sensors can thus e.g. be based on different measurement principles.

The primary environmental sensor and the secondary environmental sensor can be oriented in approximately the same direction so that they at least regionally cover overlapping fields of view or measurement zones. The orientation of the environmental sensors can, for example, be towards the rear with respect to the transport vehicle so that the primary environmental sensor can, for example, see under the load, in particular when the load is raised. The secondary environmental sensor can preferably be attached to a rear end of the transport vehicle, for example to the ends of a fork if the transport vehicle is a fork-lift truck. Due to the attachment to the rear end, the secondary environmental sensor can detect the route and/or the drop-off location even when the load is lowered.

The drop-off location can in particular be the spatial region and/or areal region at which the load is to be located after the placement by the transport vehicle. Accordingly, the drop-off location can e.g. have the shape and/or size of a pallet transported by the transport vehicle.

The transport vehicle can in particular comprise a control unit that controls the actions of the transport vehicle mentioned herein and that also evaluates the measurement data supplied by the environmental sensors. The control unit can in particular be connected via radio, for example WLAN, to a higher-ranking automation system. The higher-ranking automation system can in particular inform the transport vehicle where the drop-off location for a load is located, as will be explained in more detail later.

Advantageous further developments of the invention can be seen from the description, from the drawings and from the dependent claims.

According to a first embodiment, the transport vehicle is configured, using the primary environmental sensor, to also detect neighboring regions of the drop-off location in addition to the drop-off location and to compare the detected neighboring regions with expected neighboring regions. The primary environmental sensor (but also the secondary environmental sensor) can in particular detect two-dimensional contours of the drop-off location and the neighboring regions in each case. The expected neighboring regions can likewise include two-dimensional contours that in particular show the boundary of the drop-off location (e.g. in a plan view). The neighboring regions can therefore in particular represent the boundary of the drop-off location.

The detection by means of the primary environmental sensor, for example, takes place when the transport vehicle is stationary, wherein the detection is e.g. also possible during slow travel. If faster sensors are available in the future, a detection at a normal speed could also be made possible.

According to a further embodiment, the transport vehicle is configured to receive the expected neighboring regions from a higher-ranking automation system.

According to a further embodiment, the transport vehicle is configured, when checking for obstacles by means of the primary environmental sensor, to perform a plausibility check of the measurement data acquired by the primary environmental sensor. The plausibility check serves to better recognize possibly present obstacles and can in particular be based on the expected neighboring regions.

According to a further embodiment, the transport vehicle is configured to set a tolerance region around the expected neighboring regions during the plausibility check, wherein measurement points outside the tolerance region that lie in front of or behind the expected neighboring regions and/or missing measurement points are evaluated as an obstacle.

Due to the expected neighboring regions, the transport vehicle knows where, for example, a rear boundary of the drop-off location should be. If measurement points that lie in front of the expected rear boundary (and also outside the tolerance region) are now detected by means of an environmental sensor, this indicates that e.g. a person is located here. The same can be the case if measurement points are located outside the tolerance region and behind the expected neighboring region. If, for example, it is assumed that the rear boundary of the drop-off location is formed by a wall or another pallet, no measurement points should lie behind the expected neighboring region. In practice, however, it can occur that e.g. black trouser legs "swallow" a lot of signal so that the environmental sensor incorrectly reports that a measurement point is located behind the expected neighboring regions. This can in turn be an indication of an obstacle so that the transport vehicle must then take countermeasures and stop, for example.

Missing measurement points can likewise indicate that no measurement was possible, e.g. due to black trouser legs or the like, although it can be assumed based on the known expected neighboring regions that a measurement point should be present.

The tolerance region can in particular extend at both sides around a contour of the expected neighboring region and can in particular have a predetermined size or width. For example, the tolerance region can in each case end 15 cm, 20 cm or 30 cm remote from the expected neighboring region at both sides.

According to a further embodiment, the transport vehicle is configured to adapt the detected neighboring regions and the expected neighboring regions to one another, in particular by rotation and displacement. The adaptation can be performed by the vehicle itself, i.e. by a control unit of the transport vehicle, for example. Alternatively, the adaptation can also be performed by an external unit, wherein the transport vehicle can then receive the result. Due to the adaptation, the transport vehicle can e.g. recognize a slanted swap body that has not been driven completely straight to a loading terminal, for example.

According to a further embodiment, the transport vehicle is configured to determine the length of the travel path up to the drop-off location and, during the journey to the drop-off location, to monitor the actually covered travel path by means of a driving sensor system that is in particular coupled to a wheel or an axle of the transport vehicle. The driving sensor system can determine a covered travel path e.g. via the number of wheel revolutions. The monitoring by means of the driving sensor system can preferably be safety-oriented, i.e. fulfill a safety level such as SIL2, SIL3 or SIL4 (SIL for Security Integrity Level), for example.

If the driving sensor system recognizes that the transport vehicle has covered more than the determined length of the travel path, a countermeasure can in turn be taken, such as stopping the vehicle or reversing the direction of travel.

The monitoring of the travel path by means of the driving sensor system serves to create additional safety so that the transport vehicle does not travel beyond the drop-off location since obstacles outside the drop-off location or behind the drop-off location may not have been detected. This also prevents adjacent objects or boundaries from being damaged when driving beyond the drop-off location.

According to a further embodiment, the transport vehicle is configured to disregard the primary environmental sensor when approaching the drop-off location. This means that the primary environmental sensor is "muted" after the approach to the drop-off location has started. Due to the "muting", the primary environmental sensor is therefore, for example, switched off or the measurement values of the primary environmental sensor are at least not considered and/or processed further.

Typically, the load must be lowered when entering a truck or a swap body, whereby the primary environmental sensor is often covered by the load so that the function of the primary environmental sensor is impaired. Accordingly, the "muting" can also prevent the lowered load from being recognized as an obstacle. However, when approaching the drop-off location, the secondary environmental sensor is then, as stated above, activated and evaluated to replace and check the primary environmental sensor blocked by the load in this regard.

According to a further embodiment, the transport vehicle is configured to also disregard the secondary environmental sensor when approaching the drop-off location if the transport vehicle comes closer than a predetermined threshold value to the detected and/or expected neighboring regions. If the transport vehicle therefore approaches the detected and/or expected neighboring regions, the secondary environmental sensor then acquires measurement values from these neighboring regions that may, for example, lie in a protected field of the secondary environmental sensor. If the secondary environmental sensor recognizes a measurement value or an obstacle in its protected field, this can cause the transport vehicle to stop, which is undesirable since the load could then not be fully transported up to the drop-off location. For this reason, the secondary environmental sensor is also "muted" if the transport vehicle comes so close to the neighboring regions (i.e., for example, an adjacent pallet) that e.g. an adjacent pallet would cause a protected field violation. The predetermined threshold value can therefore correspond to the size of the protected field of the secondary environmental sensor. Alternatively, the predetermined threshold value can also correspond to the size of the detection zone of the secondary environmental sensor.

The secondary environmental sensor is therefore preferably only "muted" when the load is already almost completely located at the drop-off location and the secondary environmental sensor has already detected the remaining area of the drop-off location and has therefore ensured that there are no obstacles (i.e. persons or objects) there.

According to a further embodiment, the transport vehicle is configured to monitor the remaining travel path, in particular solely, by means of the driving sensor system after the secondary environmental sensor has been disregarded. The relatively short remaining travel distance can therefore be monitored solely via the driving sensor system, wherein the load is then placed at the drop-off location after reaching the drop-off location. The placement can, for example, take place by lowering the fork of a fork-lift truck.

According to a further embodiment, the primary and/or secondary environmental sensor comprises a 2D or 3D sensor, a laser scanner, a multi-layer laser scanner, a multi-beam scanner, a 3D camera, a radar and/or an ultrasonic sensor. The primary environmental sensor is preferably configured as a laser scanner and the secondary environmental sensor is preferably configured as an ultrasonic sensor. In this way, different measurement principles can be used to safeguard the travel path and the drop-off location.

For example, the primary environmental sensor can be attached at a height of around 200 mm above the ground and can have a single scanning plane parallel to the ground. The secondary environmental sensor preferably comprises two individual sensors, each of which are ultrasonic sensors. Both the primary environmental sensor and the secondary environmental sensor can be oriented towards the rear, wherein the two ultrasonic sensors can, for example, be attached to the ends of a fork of the transport vehicle.

According to a further embodiment, the transport vehicle is an autonomous fork-lift truck or an autonomous ground conveyor.

A further subject of the invention is a method for placing a load at a drop-off location by means of a transport vehicle, in which,

- first, using the primary environmental sensor, a drop-off location for the load and the region between the drop-off location and the transport vehicle are detected and checked for obstacles;
- if no obstacle is recognized, the transport vehicle travels to the drop-off location;
- during the journey to the drop-off location, the route and the drop-off location are checked for obstacles using the secondary environmental sensor.

According to a further development of the method, the drop-off location is located in a truck or a swap body and, before the detection of the drop-off location using the primary environmental sensor, the transport vehicle moves to a position outside the truck or the swap body, from which position the drop-off location can be detected by the primary environmental sensor. This means that the transport vehicle initially remains outside the truck or the swap body to perform the detection from outside using the primary environmental sensor and to determine the travel path and the drop-off location.

A swap body can also be referred to as an exchangeable container or an interchangeable unit and is an interchangeable load carrier that can e.g. be driven under by a carrier vehicle and separated from the carrier vehicle again.

According to a further development, in order to detect the drop-off location by means of the primary environmental sensor, the load is raised to allow the primary environmental sensor to see under the load through to the drop-off location. Such raising is in particular only possible outside the truck or the swap body. After the load has been lowered, the primary environmental sensor is then possibly covered so that the secondary environmental sensor takes over the monitoring of the travel path and the drop-off location during a driving into the truck or the swap body.

All the method steps and actions of the transport vehicle mentioned herein can in particular take place automatically, i.e. without human intervention or human assistance. In particular, the transport vehicle can receive the drop-off location by radio and can then automatically drive to the swap body in which the drop-off location is located. Finally, a check for obstacles is performed using the primary environmental sensor in the manner described. During the approach to the drop-off location, a check then takes place by means of the secondary environmental sensor, which likewise takes place automatically again. Finally, the secondary environmental sensor is muted at the drop-off location and the rest of the positioning of the load at the drop-off location takes place automatically with the driving sensors.

The statements made regarding the transport vehicle according to the invention apply accordingly to the method according to the invention. This in particular applies with respect to advantages and preferred embodiments. The further developments of the method also apply to the transport vehicle. It is furthermore understood that all the features mentioned herein are combinable with one another, unless explicitly stated otherwise.

Figure 2:
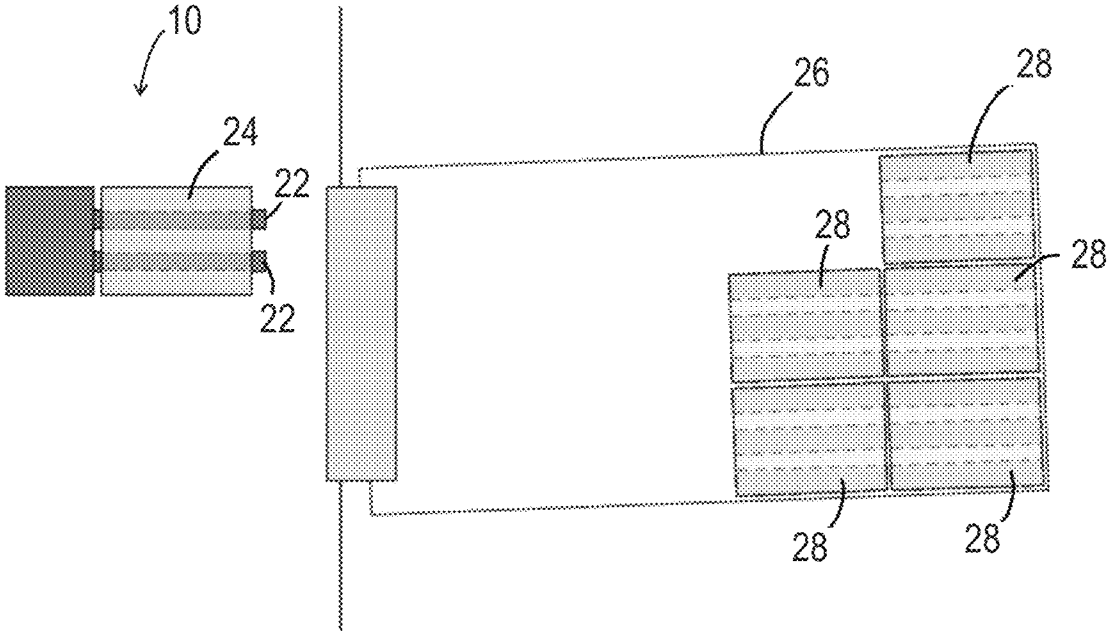
Figure 3:
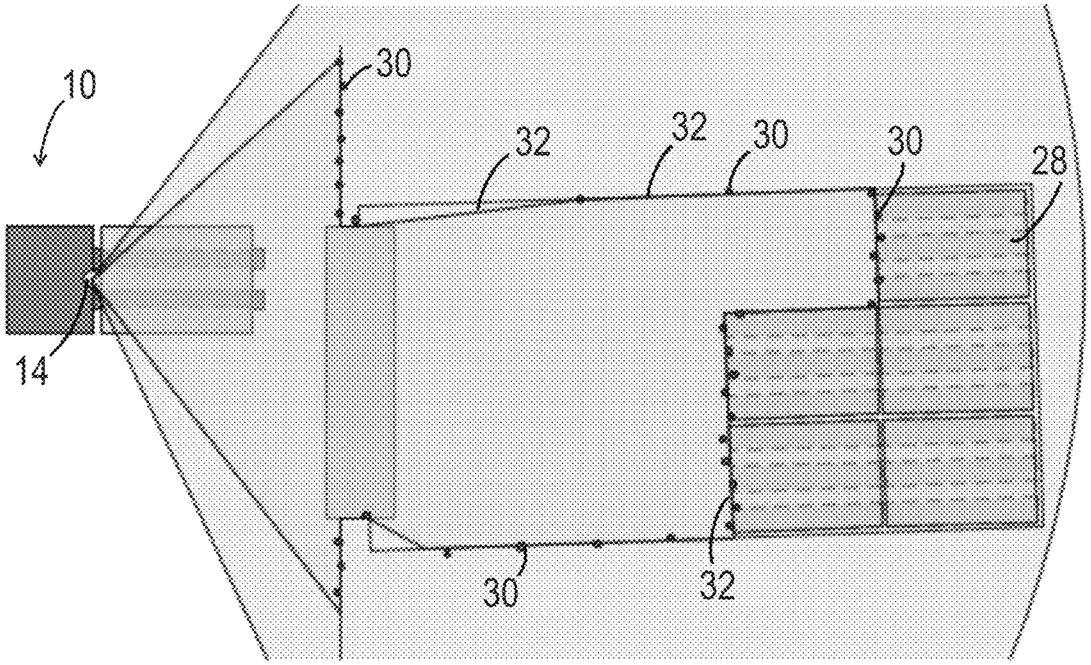
Figure 4A:
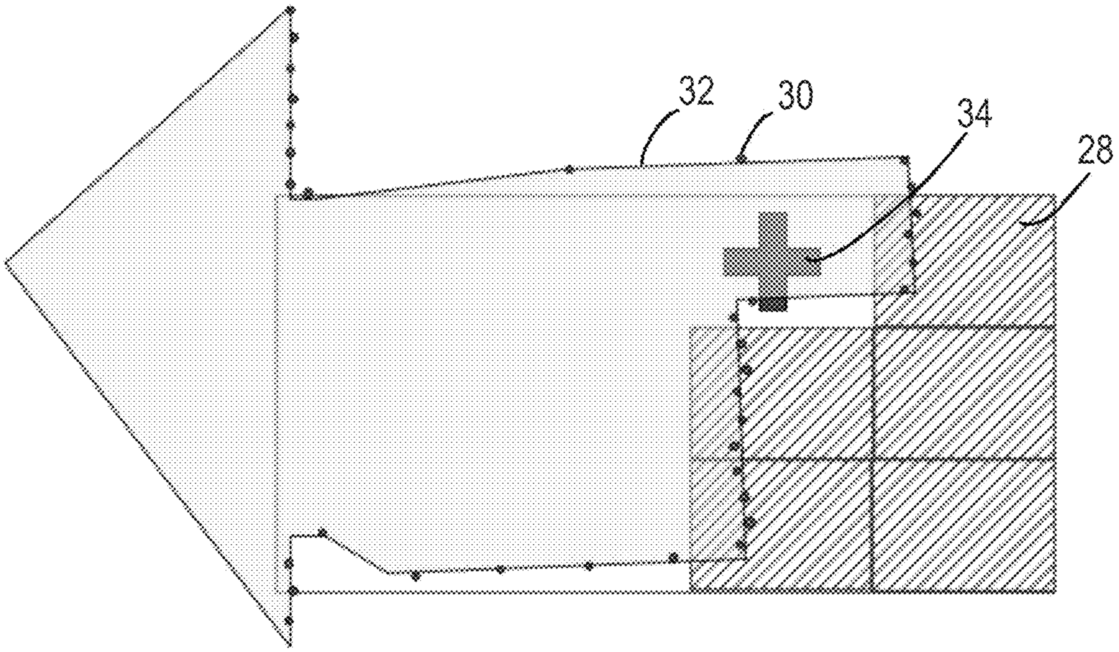
Figure 4B:
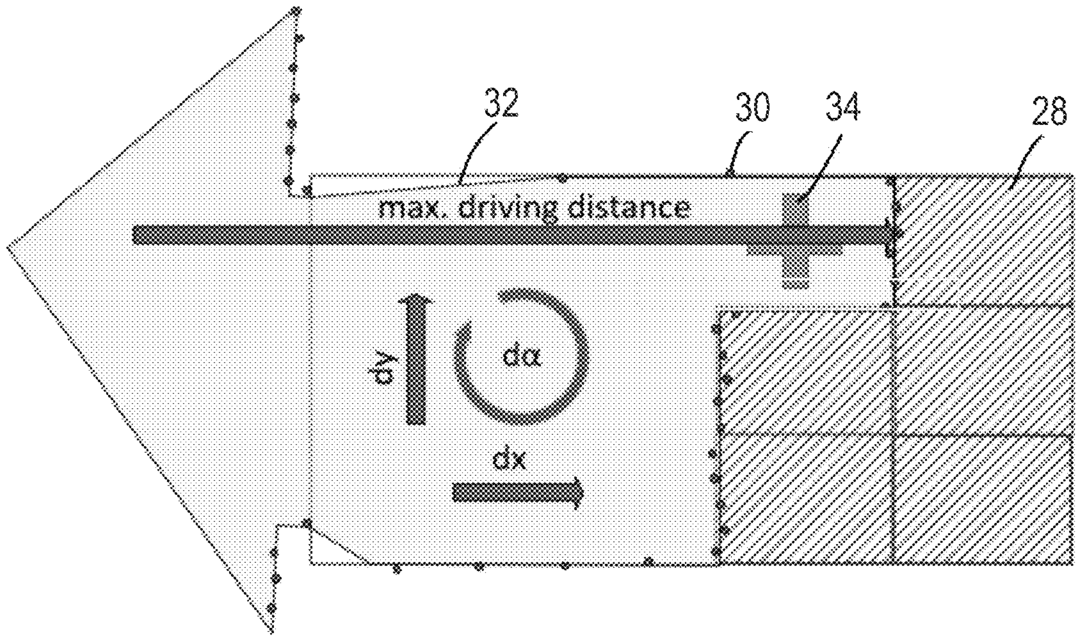
Figure 5:
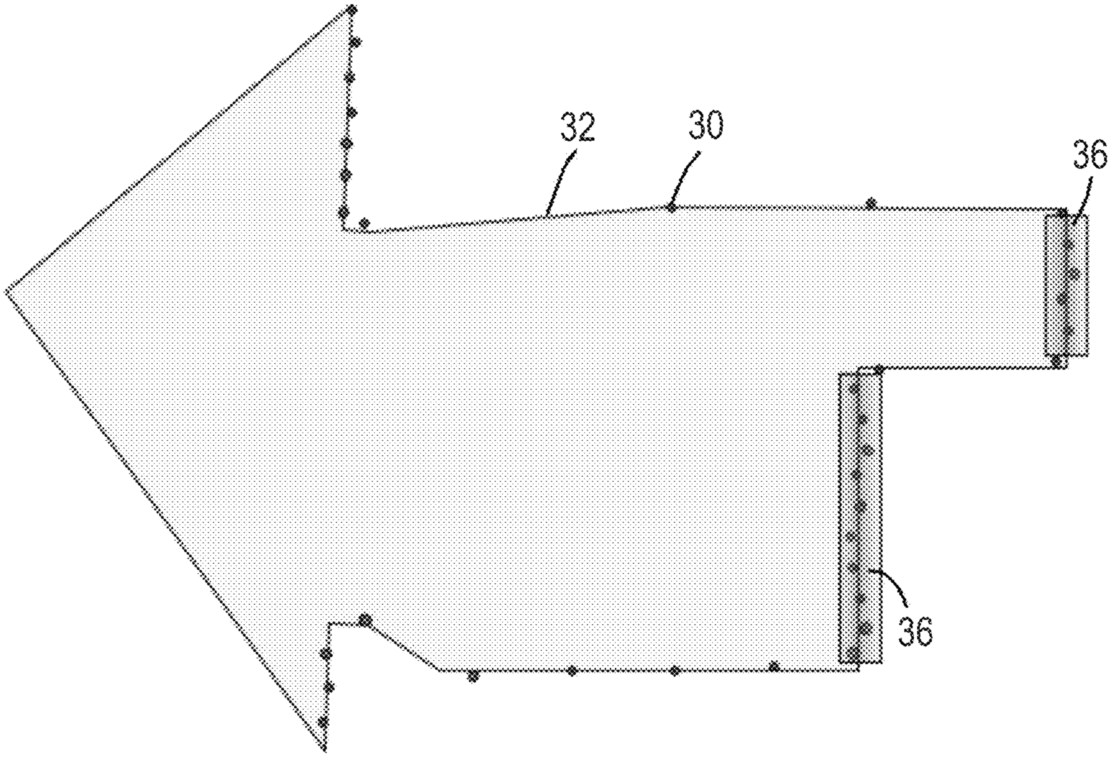
Figure 6:
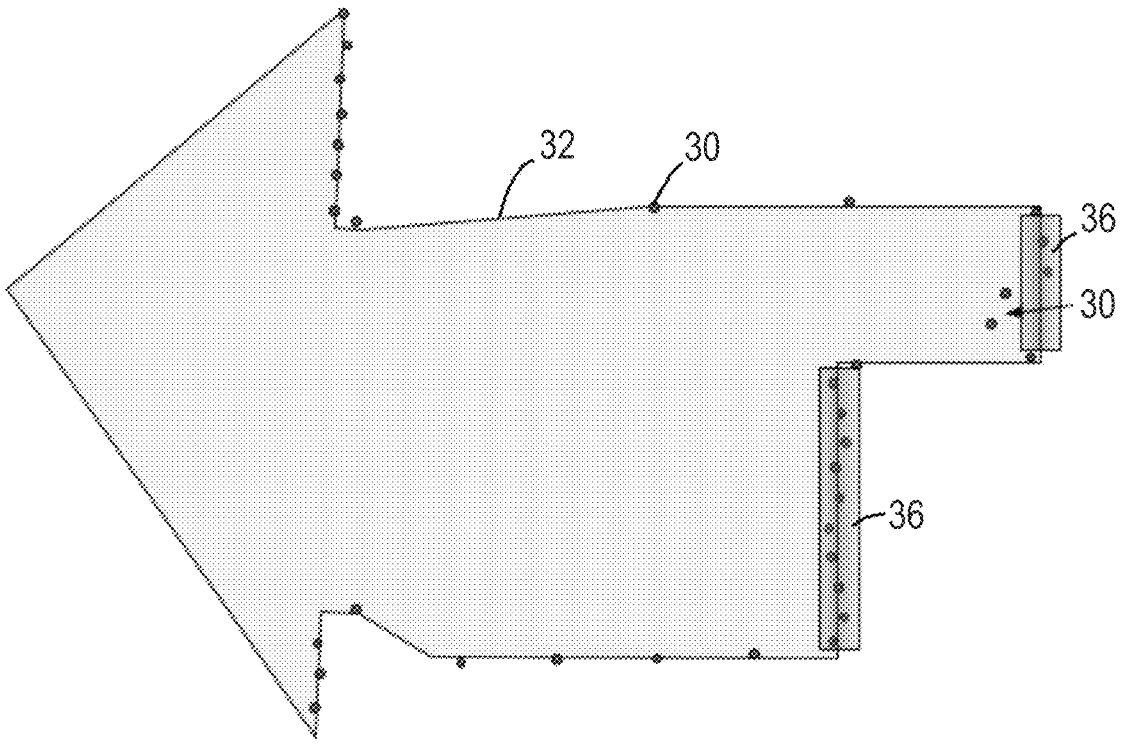
Figure 7:
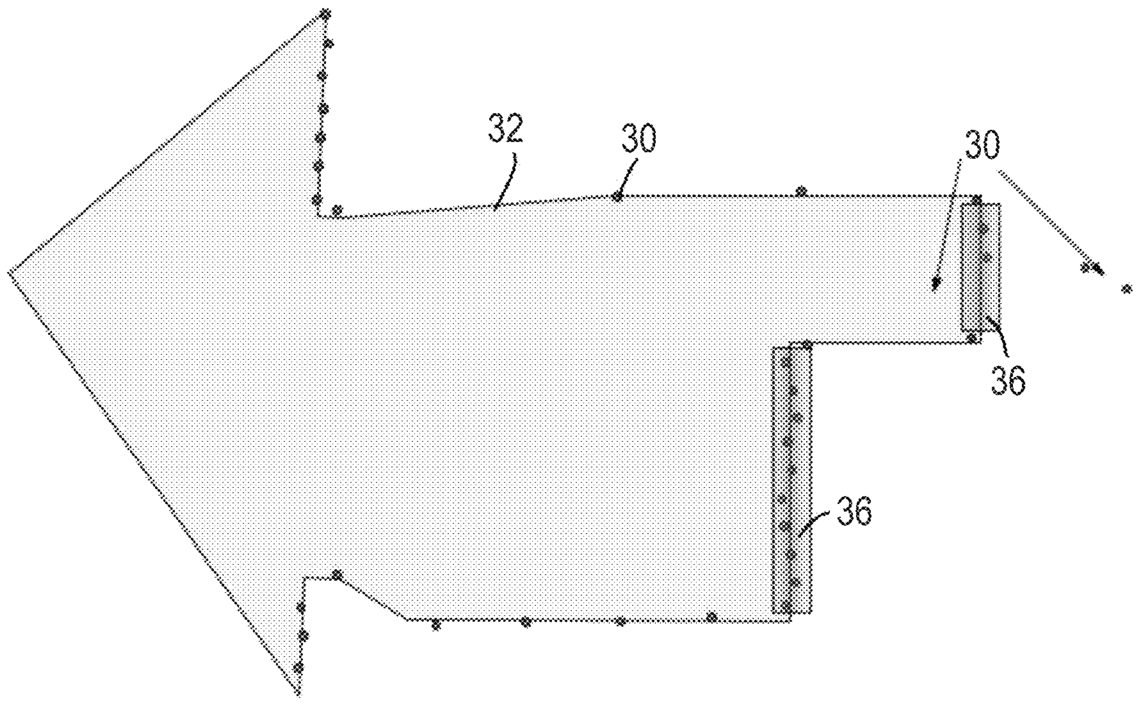
Figure 8:
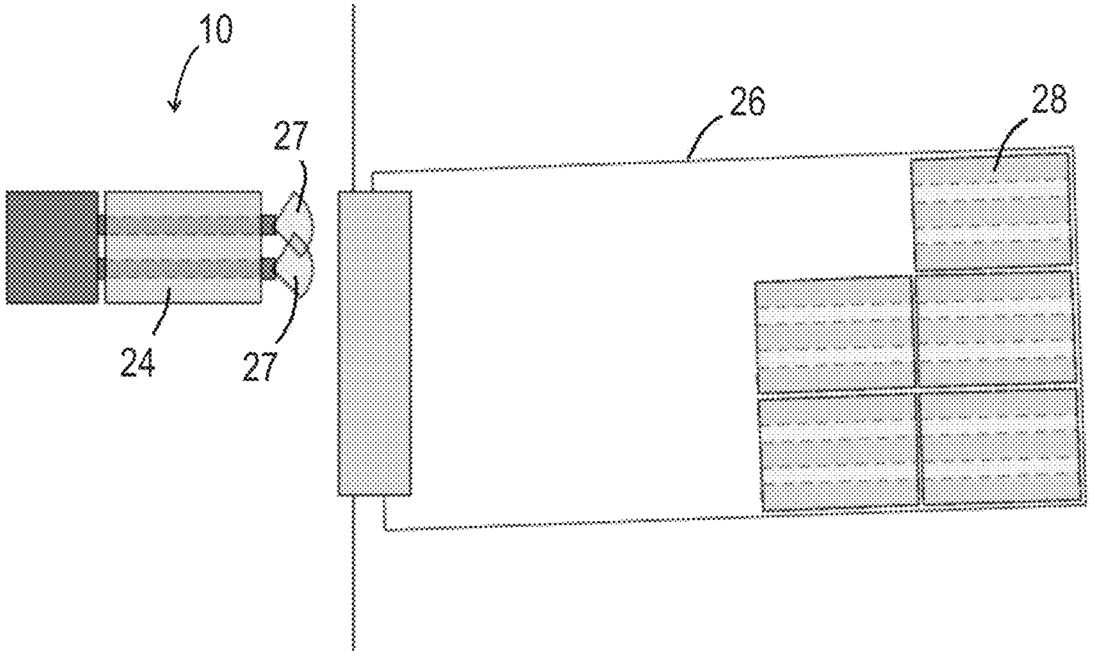
Figure 9:
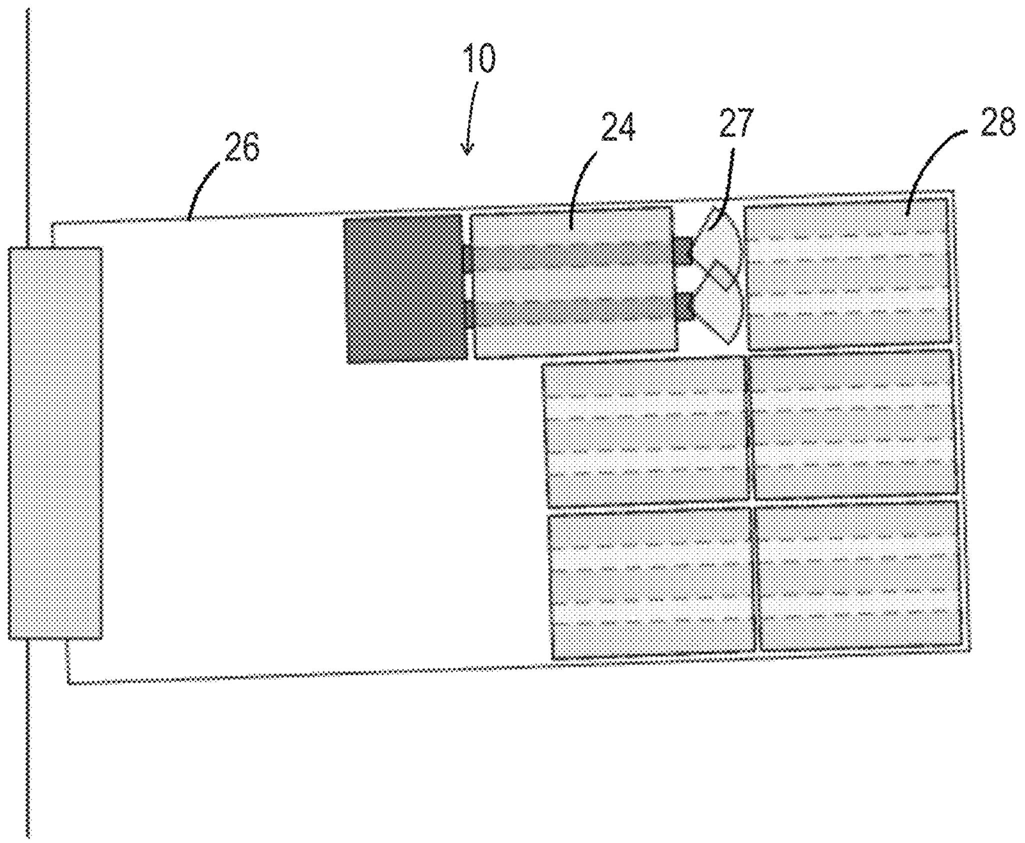
Figure 10:
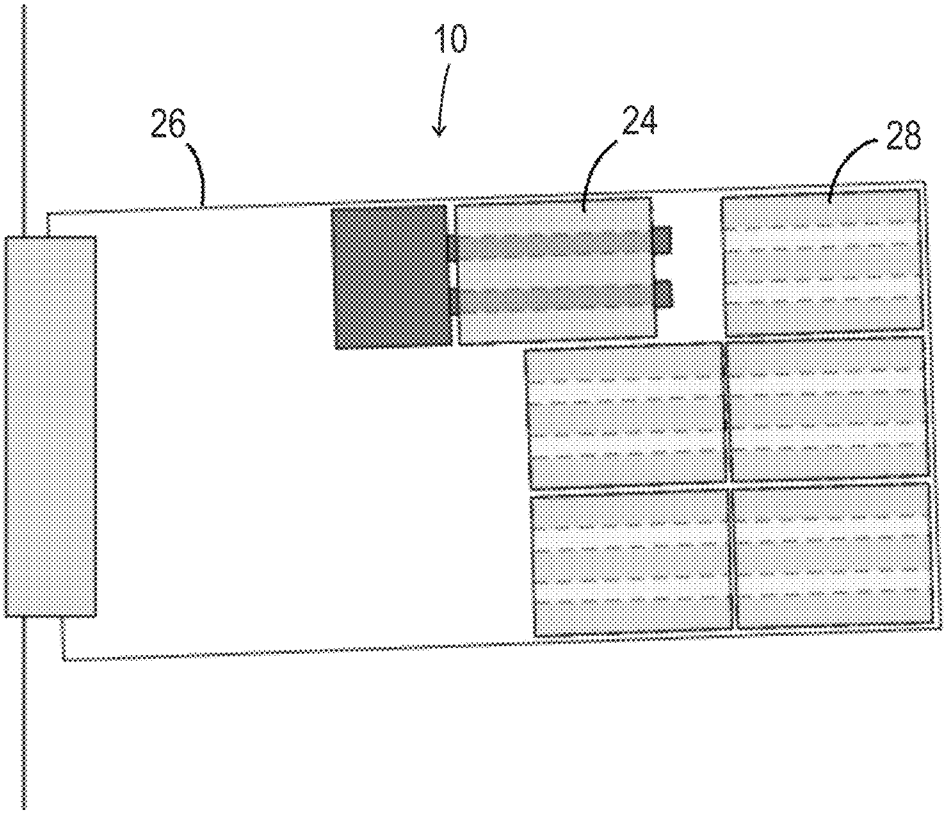

The invention will be described purely by way of example with reference to the drawings in the following. There are shown:

FIG. 1 schematically in a side view, a transport vehicle that approaches a swap body;

FIG. 2 the transport vehicle and the swap body in a schematic plan view;

FIG. 3 a detection of the swap body by means of the primary environmental sensor;

FIGS. 4A and 4B an adaptation of the acquired measurement values;

FIG. 5 a check for obstacles;

FIG. 6 the detection of an obstacle in accordance with a first possibility;

FIG. 7 the detection of an obstacle in accordance with a second possibility;

FIG. 8 the start of the driving of the transport vehicle into the swap body;

FIG. 9 the start of the approaching of the drop-off location by the transport vehicle;

FIG. 10 the switching off of the secondary environmental sensor; and

Figure 11:
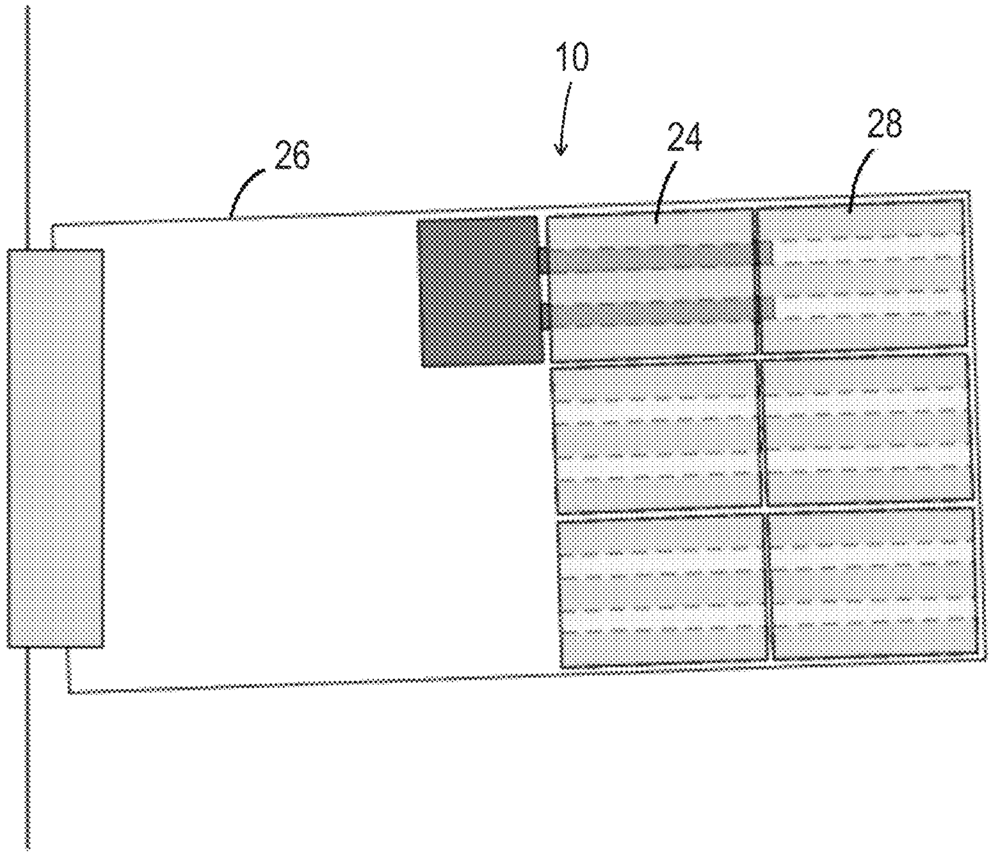

FIG. 11 the positioning of the load at the drop-off location.

FIG. 1 shows an automated guided vehicle, more precisely an autonomous fork-lift truck 10. The fork-lift truck 10 comprises a control unit 12 that controls a drive of the fork-lift truck 10. The control unit 12 is furthermore coupled to a primary environmental sensor in the form of a laser scanner 14 and a secondary environmental sensor that comprises two ultrasonic sensors 16. The control unit 12 is furthermore coupled to a driving sensor system 18 that is fastened to a wheel of the fork-lift truck 10 and that detects the movements of the wheel. The sensors 14, 16, 18 are coupled to the control unit 12 via data links 20.

The fork-lift truck 10 comprises a fork 22 on which a load 24 can be transported. The ultrasonic sensors 16 are arranged at both ends of the fork 22.

The laser scanner 14 is arranged such that it can look backwards under the load 24 when the load 24 is raised. Accordingly, the laser scanner 24 emits laser pulses 25 to the rear during operation to detect the environment. Via reflected laser pulses (not shown), the laser scanner 24 determines the light propagation time and, from this, the distance of objects in its measurement zone.

The ultrasonic sensors 16 emit ultrasonic waves 27 in a corresponding manner.

FIG. 1 furthermore shows a swap body 26 that is arranged on a truck trailer and driven up to a loading terminal (not shown) so that the autonomous fork-lift truck can drive into the swap body 26.

In FIG. 2, the fork-lift truck 10 and the swap body 26 are now shown in a schematic plan view. It can be seen that a plurality of unloaded pallets are already present in the swap body 26. The load transported by the fork-lift truck 10 is also a pallet that is to be positioned next to the already unloaded pallets 28.

FIG. 3 now shows that a scan of the swap body 26 and the wider surroundings first takes place by means of the laser scanner 14. The laser scanner 14 in this respect acquires a plurality of measurement points 30 that form a contour 32. Due to the scan with the primary environmental sensor, i.e. with the laser scanner 14, a detection of the drop-off location 34 and the travel path of the fork-lift truck up to the drop-off location 34 as well as the environment of the drop-off location and the path of travel, i.e. the neighboring regions, therefore takes place. Accordingly, the contour 32 therefore forms the detected neighboring regions.

The control unit 12 can receive data on the loading status of the swap body 26 from a higher-ranking automation system via a radio interface (not shown):

In FIG. 4A, the areas shown hatched are those areas that are communicated to the fork-lift truck 10 by the higher-ranking automation system as already occupied by pallets. Furthermore, the fork-lift truck 10 is informed of a drop-off location 34. In particular, X-Y coordinates of the contour of the already unloaded pallets 28 can in each case be communicated to the fork-lift truck 10 by the higher-ranking automation system. The same applies to the coordinates of the drop-off location 34.

It can be seen that the measurement or scanning of the fork-lift truck 10 by its laser scanner 14 does not completely match the contours obtained from the higher-ranking automation system.

As shown in FIG. 4B, an adaptation of the obtained contour (i.e. the expected neighboring regions) and the measured contour (i.e. the detected neighboring regions) therefore takes place. The adaptation in particular takes place by rotation (da) and displacement (dx, dy). Due to the adaptation, the drop-off location 34 and the expected neighboring regions are adapted to the reference system of the fork-lift truck 10.

After the adaptation (or even before), a check for obstacles, i.e., for example persons in the way, takes place. For this purpose, a tolerance region 36 is at least regionally set around the expected neighboring regions, as shown in FIG. 5. There are no measurement points 30 in FIG. 5 that would indicate an obstacle.

In FIG. 6, on the other hand, there are two measurement points 30 in front of the tolerance region 36 so that it can be assumed here that a person is standing in front of the already loaded pallet 28. In this case, the fork-lift truck 10 may not approach the drop-off location 34.

FIG. 7 shows another variant of recognizing a person. In the case shown in FIG. 7, the person is wearing dark trousers so that the laser scanner 14 receives almost no reflected signal from the trouser legs. In practice, this often leads to measurement values being generated further away from the laser scanner 14, which is also shown in FIG. 7. However, since no values can be located in this region since the unloaded pallet 28 is located there, this is also evaluated as the recognition of an obstacle (i.e. a person).

The ultrasonic sensors 16 remain activated until the fork-lift truck 10 has almost reached the drop-off location 34 and the already unloaded pallets 28 come so close to the ultrasonic sensors 16 that the ultrasonic sensors 16 would recognize the unloaded pallets 28 as an obstacle. At this point in time, the ultrasonic sensors 16 are switched off or disregarded, as shown in FIG. 10. The fork-lift truck 10 then travels the remaining distance up to the drop-off location 34 solely based on the driving sensor system 18 since it is now ensured that there is no obstacle between the load 24 and the already unloaded pallets 28.

If the fork-lift truck 10 now reaches the position shown in FIG. 11, the fork 22 is fully lowered to unload the load 24 at the drop-off location 34.

In this way, an automatic loading of a swap body 26 is possible, whereby any risk to persons can be ruled out.

REFERENCE NUMERAL LIST

10 autonomous fork-lift truck
12 control unit
14 laser scanner
16
18 ultrasonic sensor
20 driving sensor system
22 data link
22 fork
24 load
25 laser pulse
26 swap body
27 ultrasonic waves
28 unloaded pallet
30 measurement point
32 contour
34 drop-off location
36 tolerance region

The invention claimed is:

1. An automated guided vehicle for transporting and placing a load, said automated guided vehicle comprising a primary environmental sensor and at least one secondary environmental sensor, wherein the automated guided vehicle is configured, first, using the primary environmental sensor, to detect a drop-off location for the load and the region between the drop-off location and the automated guided vehicle and to check said drop-off location and said region for obstacles;

if no obstacle is recognized, to travel to the drop-off location;

during the journey to the drop-off location, to check the route and the drop-off location for obstacles using the secondary environmental sensor, wherein the automated guided vehicle is configured, using the primary environmental sensor, to also detect neighboring regions of the drop-off location in addition to the drop-off location and to compare the detected neighboring regions with expected neighboring regions.

2. The automated guided vehicle according to claim 1, wherein the automated guided vehicle is configured to receive the expected neighboring regions from a higher-ranking automation system.

3. The automated guided vehicle according to claim 1, wherein the automated guided vehicle is configured, when checking for obstacles by means of the primary environmental sensor, to perform a plausibility check of measurement data acquired by the primary environmental sensor.

4. The automated guided vehicle according to claim 1, wherein the automated guided vehicle is configured to set a tolerance region around the expected neighboring regions during a plausibility check, wherein measurement points outside the tolerance region that lie in front of or behind the expected neighboring regions and/or missing measurement points are evaluated as an obstacle.

5. The automated guided vehicle according to claim 1, wherein the automated guided vehicle is configured to adapt the detected neighboring regions and the expected neighboring regions to one another.

6. The automated guided vehicle according to claim 5, wherein the automated guided vehicle is configured to adapt the detected neighboring regions and the expected neighboring regions to one another by rotation and displacement.

7. The automated guided vehicle according to claim 1, wherein the automated guided vehicle is configured to determine a length of a travel path up to the drop-off location and, during a journey to the drop-off location, to monitor an actually covered travel path by means of a driving sensor system.

8. The automated guided vehicle according to claim 7, wherein the driving sensor system is coupled to a wheel or an axle of the automated guided vehicle.

9. The automated guided vehicle according to claim 1, wherein the automated guided vehicle is configured to disregard the primary environmental sensor when approaching the drop-off location.

10. The automated guided vehicle according to claim 1, wherein the automated guided vehicle is configured to disregard the secondary environmental sensor when approaching the drop-off location if the automated guided vehicle comes closer than a predetermined threshold value to the detected and/or expected neighboring regions.

11. The automated guided vehicle according to claim 7, wherein the automated guided vehicle is configured to disregard the secondary environmental sensor when approaching the drop-off location if the automated guided vehicle comes closer than a predetermined threshold value to the detected and/or expected neighboring regions and wherein the automated guided vehicle is configured, after the secondary environmental sensor has been disregarded, to monitor the remaining travel path by means of the driving sensor system.

12. The automated guided vehicle according to claim 1, wherein the primary and/or the secondary environmental sensor comprises a 2D or 3D sensor, a laser scanner, a multi-layer laser scanner, a multi-beam scanner, a 3D camera, a radar and/or an ultrasonic sensor.

13. The automated guided vehicle according to claim 12, wherein the primary environmental sensor is configured as a laser scanner.

14. The automated guided vehicle according to claim 12, wherein the secondary environmental sensor is configured as an ultrasonic sensor.

15. The automated guided vehicle according to claim 1, wherein the automated guided vehicle is an autonomous fork-lift truck or an autonomous ground conveyor.

16. A method for placing a load at a drop-off location by means of a transport vehicle, in which first, using a primary environmental sensor, a drop-off location for the load and the region between the drop-off location and the transport vehicle are detected and checked for obstacles;

if no obstacle is recognized, the transport vehicle travels to the drop-off location;

during the journey to the drop-off location, the route and the drop-off location are checked for obstacles using a secondary environmental sensor, wherein the drop-off location is located in a truck or a swap body and, before the detection of the drop-off location using the primary environmental sensor, the transport vehicle moves to a position outside the truck or the swap body, from which position the drop-off location can be detected by the primary environmental sensor.

17. The method according to claim 16, wherein, in order to detect the drop-off location by means of the primary environmental sensor, the load is raised to allow the primary environmental sensor to see under the load through to the drop-off location.

18. An automated guided vehicle for transporting and placing a load, said automated guided vehicle comprising a primary environmental sensor and at least one secondary environmental sensor, wherein the automated guided vehicle is configured, first, using the primary environmental sensor, to detect a drop-off location for the load and the region between the drop-off location and the automated guided vehicle and to check said drop-off location and said region for obstacles;

if no obstacle is recognized, to travel to the drop-off location;

during the journey to the drop-off location, to check the route and the drop-off location for obstacles using the secondary environmental sensor, wherein the automated guided vehicle is configured to determine the length of the travel path up to the drop-off location and, during the journey to the drop-off location, to monitor the actually covered travel path by means of a driving sensor system.

* * * * *